United States Patent [19]

Tsinberg

[11] Patent Number: 5,055,915
[45] Date of Patent: Oct. 8, 1991

[54] METHOD AND APPARATUS FOR THE TRANSMISSION AND RECEPTION OF TWO CONVENTIONAL TELEVISION SIGNALS USING A TWO-LINE MAC FORMAT

[75] Inventor: Mikhail Tsinberg, Riverdale, N.Y.

[73] Assignee: North American Philips Corporation, New York, N.Y.

[21] Appl. No.: 353,353

[22] Filed: May 17, 1989

Related U.S. Application Data

[63] Continuation-in-part of Ser. No. 77,557, Jul. 24, 1987, Pat. No. 4,908,697.

[51] Int. Cl.⁵ .............................................. H04N 11/06
[52] U.S. Cl. ................................................. 358/12
[58] Field of Search ........................................... 358/12

[56] References Cited

U.S. PATENT DOCUMENTS

| | | | |
|---|---|---|---|
| 4,533,936 | 8/1985 | Tiemann et al. | 358/12 |
| 4,652,904 | 3/1987 | van de Polder | 358/12 |
| 4,807,030 | 2/1989 | Sacks | 358/142 |
| 4,908,697 | 3/1990 | Tsinberg et al. | 358/12 |

FOREIGN PATENT DOCUMENTS

| | | | |
|---|---|---|---|
| 225786 | 12/1983 | Japan | 358/12 |
| 134692 | 7/1985 | Japan | 358/12 |
| 219083 | 7/1985 | Japan . | |

OTHER PUBLICATIONS

Dobbie, William, "A DBTV System for Optimun Bandwidth Efficiency", Feb. 1987, pp. 58-60.

Primary Examiner—Howard W. Britton
Assistant Examiner—Wendy R. Greening
Attorney, Agent, or Firm—Michael E. Marion

[57] ABSTRACT

A system is described for transmitting two conventional television signals (for example NTSC style 525 line, 2:1 interlaced signals) over a two line MAC (multiple analog component) signal. Both an encoder and a decoder and a method for use in conjunction therewith are described.

4 Claims, 7 Drawing Sheets

METHOD AND APPARATUS FOR THE TRANSMISSION AND RECEPTION OF TWO CONVENTIONAL TELEVISION SIGNALS USING A TWO-LINE MAC FORMAT

This application is a continuation-in-part of U.S. patent application Ser. No. 077,557, filed Jul. 24, 1987 (now U.S. Pat. No. 4,908,697, which issued Mar. 13, 1990).

Cross reference to related applications and patents:
1) U.S. Pat. No. 4,694,338 issued Sept. 15, 1987
2) U.S. Pat. No. 4,794,447 issued Dec. 27, 1988
3) U.S. patent application Ser. No. 246,490, filed Sept. 19, 1988
4) U.S. patent application Ser. No. 077,557, U.S. Pat. No. 4,904,697 filed Jul. 24, 1987
5) U.S. patent application Ser. No. 271,136, filed Nov. 14, 1988

The above-referenced patents and applications are all assigned to the same assignee, have common inventorship, and are specifically incorporated by reference herein.

BACKGROUND OF THE INVENTION

The present invention relates to a system for transmitting two conventional television signals (for example NTSC style 525 line, 2:1 interlaced signals) over the two-line MAC (Multiple Analog Component) "superline" signal first disclosed in U.S. patent application Ser. No. 077,557, filed on Jul. 24, 1987 (referred to hereinafter as the '557 application) which is incorporated by reference herein. This two-line MAC signal better known as HDMAC-60 is described in the '557 application as a means for transmitting a high definition television (HDTV) signal using a MAC format.

SUMMARY OF THE INVENTION

The two line HDMAC-60 signal provides a means for distributing a high definition television signal either directly to a viewer for example by satellite (DBS), to a distribution point, for example a cable television head end, a terrestrial broadcast transmitter or a recording device.

The required bandwidth of any television signal is a function of the spacial (horizontal, vertical) and temporal resolution to be contained in that signal. As increased resolution is desired in either the vertical, horizontal or temporal directions, the bandwidth of the signal must be increased. As HDTV signals contain considerably more resolution than for example NTSC encoded signals, they require significantly more bandwidth than the 9.5 MHz video bandwidth allowed currently in satellite transmission. As disclosed in the '557 application, the HDMAC-60 signal system provides the bandwidth reduction techniques necessary to reduce the bandwidth of an HDTV signal for transmission over conventional satellite and hard wire (e.g. cable) signal paths. The present invention utilizes these bandwidth reduction techniques and the apparatus and basic structure of the HDMAC-60 encoding and decoding apparatus to provide to end users and distribution points a plurality of conventional television signals, for example two NTSC style signals, as an alternative to a single HDTV signal. "NTSC style signals", as used herein means signals which have a 525 line, 2:1 interlaced format and which can be NTSC encoded for reception on conventional television receivers. Conventional signals can also be PAL or SECAM type signals.

The embodiment of the invention described herein provides the ability for an operator to easily switch the equipment (encoder/decoder) from conventional signal delivery to HDTV signal delivery, i.e. from an "HDTV signal mode" to a "conventional signal mode". This in turn provides a valuable and immediate commercial use for the HDMAC-60 system pending widespread development and distribution of high definition television.

As described in the '557 application, there are seven time multiplexed analog components within the HDMAC-60 "superline" structure. The line time of a superline is 127.11 microseconds which is equal to, for example, four sequential HDTV lines or two NTSC interlaced lines. For the transmission of high definition television, the components are for example as follows:

Y1, a packet for transmitting a low resolution luminance signal for a first TV line;

Y3, a packet for transmitting a high resolution luminance packet for a third TV line;

U1, a packet for transmitting the chroma difference of the first TV line;

V3, a packet for transmitting the V chroma difference component of the third line;

LD2, a packet for transmitting a line difference signal which can be derived by the formula LD=B-(A+C)/2;

LD4, a packet for transmitting a second line differential signal derived in a similar fashion as for the LD2 packet;

and finally a DSS packet for transmitting digital sync and sound to provide high quality audio.

The HDMAC-60 signal provides 131 "superlines" for each TV field. Four luminance packets are provided for each superline thereby creating the capability for 524 luminance packets for each field which is a necessary requirement for the transmission of high definition television (either a 525 line; 1:1 progressive system or a 1050 line; 2:1 interlaced system) substantially free of motion artifacts. The number of luminance components necessary to transmit a 525; 2:1 interlaced signal is exactly half of that necessary to transmit a 525, 1:1 progressive signal (e.g. an HDTV signal). The embodiment of the instant invention described herein utilizes the 524 luminance packet capability of the HDMAC-60 superline to carry two sets of 262 luminance components representing two individual conventional television signals (e.g. NTSC style signals) on the HDMAC-60 superline. This is done while still preserving the seven component time block configuration of the HDMAC-60 signal.

In accordance with the invention, the HDMAC-60 encoder and decoder circuitry disclosed in the '557 application can be modified to enable it to switchably select between the transmission/reception of HDTV signals or a plurality of conventional signals, for example two NTSC type signals.

BRIEF DESCRIPTION OF THE DRAWINGS

FIG. 6 a–c are two-dimensional spectrum diagrams of the chroma components Q and I and luminance component Y of an NTSC type signal with a 4:3 aspect ratio;

FIGS. 7 a–c are two-dimensional spectrum diagrams of the chroma components Q and I and luminance Y components of an NTSC type signal having a 16:9 aspect ratio.

DETAILED DESCRIPTION OF THE INVENTION

As discussed in the '557 application in connection with HDTV, the HDMAC-60 system is not limited to the processing of any one signal configuration and is equally applicable to other high definition television signals which can be encoded for transmission over a channel having a narrower bandwidth than the bandwidth created by the HDTV source. Similarly, although the embodiment of the instant invention described herein involves the delivery of two NTSC type signals it is not limited thereto and encompasses the processing of any suitable conventional television signals, for example PAL or SECAM type signals. These signals can provide higher quality pictures than do conventional NTSC encoded signals and they can provide either a 4:3 or 16:9 aspect ratio picture to an appropriate receiver. The signals can however be easily NTSC encoded after HDMAC-60 transmission and decoding, for reception on standard NTSC television receivers.

In the embodiment described herein, although the channel carrying the HDMAC-60 signal is assumed to be a satellite, cable or recording channel having a baseband bandwidth limitation of 9.5 MHz the invention is not so limited.

Figure 1:
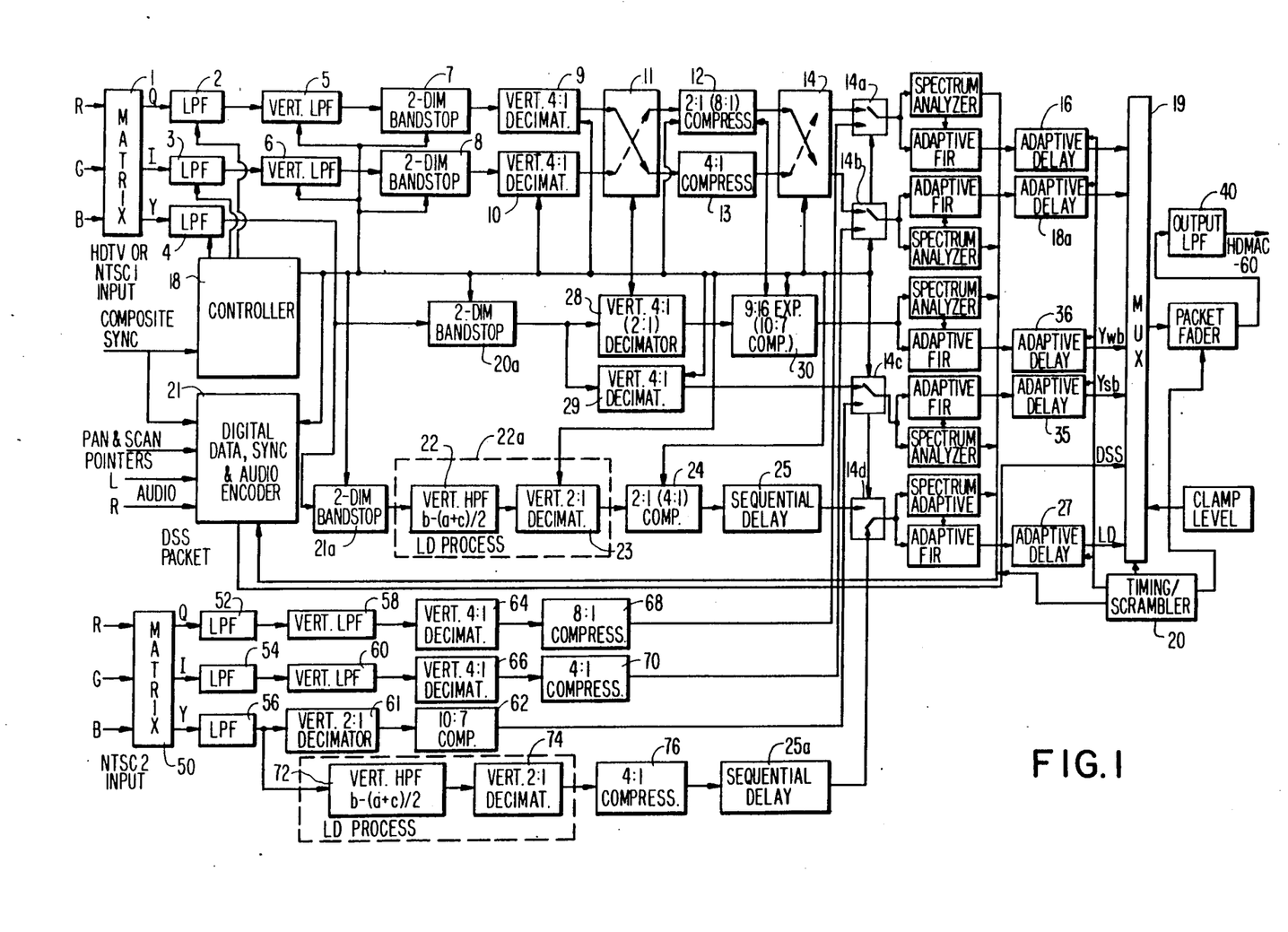
FIG. 1 is a block diagram of an embodiment of an HDMAC-60 encoder designed for switchable use in accordance with the invention.

Referring now to FIG. 1, an encoder is shown which is used to convert RGB source signals into tim multiplexed analog component signals in accordance with the instant invention. The encoder shown is similar to the HDMAC-60 encoder described in FIG. 1 of the '557 application (for HDTV signal delivery) and where applicable identical numerals have been given to corresponding components shown thereon.

As discussed in the '557 application, the signals processed by the encoder can either be in analog or digital form. If digital processing is used, the various signal components are converted using A/D converters (not shown herein) after low pass filtering in filters 2,3,4 and 52, 54 and 56 and the digital output of the multiplexer 19 must be converted to an analog signal using a D/A converter (not shown herein).

The encoder comprises a number of changes as compared to the '557 application which enables it to be used with either a single HDTV signal input or two NTSC type signal inputs. These changes enable the encoder to easily be switched between the HDTV mode and the conventional mode under the enhanced control provided by controller 18. A second input section is provided for a second RGB signal input.

In addition to the control functions described in the '557 application, controller 18 provides the following additional switching and control functions:

a) control is provided to low pass filters 2, 3 and 4 which enables the frequency response of these filters to be changeable depending on the chosen mode of operation, either HDTV or conventional. Means to accomplish the tuning control is known in the art and need not be further described herein;

b) two dimensional bandstop filters 7, 8 and 20a, and switches 11 and 14 are not needed in the conventional mode and can be bypassed under the control of controller 18;

c) vertical decimator 29 is not needed in the conventional mode and can be removed from the circuit under the control of controller 18;

d) control is provided to compressors 12, 24, 30 which enables their compression/expansion ratios to be adjusted depending on the chosen mode of operation and to decimator 28 to choose the appropriate decimation ratio for the selected mode; and e) control is provided to switches 14a–14d to properly control the insertion of the various signal packets derived by the encoder, into the HDMAC-60 signal.

Figure 1A:
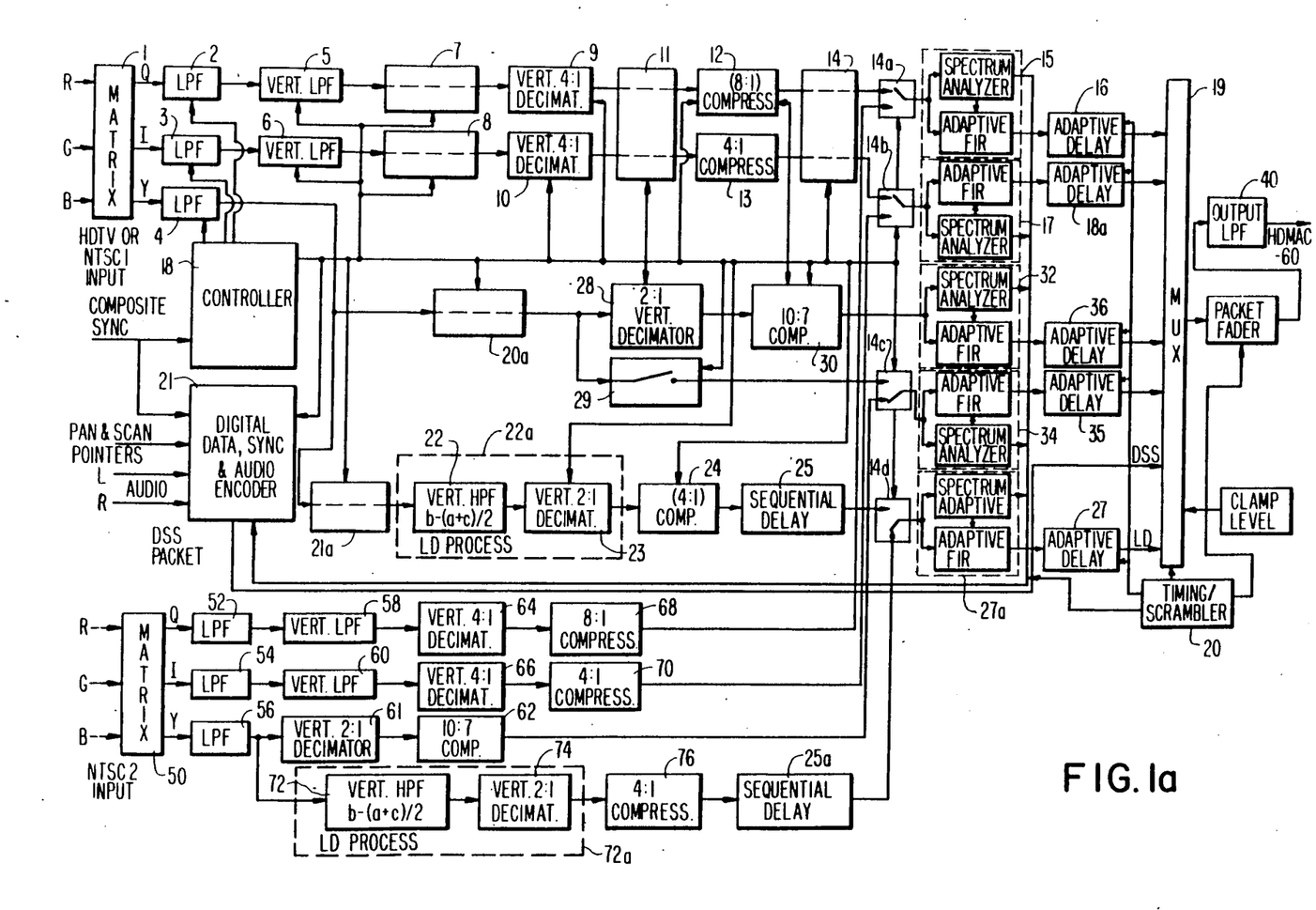
FIG. 1a is the block diagram of FIG. 1 redrawn to indicate the signal paths and circuit conditions present when the encoder is placed in the conventional mode.

FIG. 1a shows the block diagram of FIG. 1 redrawn to reflect the operation of the encoder when in the conventional signal mode, e.g. for the processing of two NTSC type signals, noted herein as NTSC 1 and NTSC 2.

NTSC 1 is provided in RGB form to matrix 1 which derives a luminance component Y and two chrominance components Q and I. In the '557 application, the chrominance components were denoted U and V. Q and I are used herein because they are most frequently associated with NTSC. This should not however be construed as a limitation to the invention. Similarly, NTSC 2 is provided, in RGB form to matrix 50 which derives therefrom, Y, Q and I components. Identification of the derived components will hereafter be described with the letter representing the type of component, a first suffix representing the line number from which the component is derived and a second suffix representing either NTSC 1 or 2, for example Q1-2 represents a Q component derived from line 1 of NTSC 2.

When the encoder is to be used in the conventional mode, controller 18 provides a signal to horizontal low pass filters 2, 3, and 4 causing them to change their frequency response so as to have bandwidths of approximately 1.2 MHz, 2.3 MHz and 6.6 MHz respectively, instead of the 4.75 MHz bandwidth they have when used with the HDTV signal input. Filter 4 is similarly switched to have a bandwidth of 6.6 MHz instead of the approximately 16.8 MHz bandwidth displayed when used with the high definition television signal input. These bandwidths match those of low pass filters 52, 54 and 56 respectively.

FIG. 1a describes the operation of the encoder of FIG. 1 in the conventional mode, in accordance with the invention. The following explanation assumes that controller 18 has provided the necessary switching signals to place the encoder into the conventional signal mode (as opposed to the HDTV mode described in full in the '557 application).

Chrominance Encoding

The Q and I signals of NTSC 1 pass from horizontal low pass filters 2 and 3 to vertical low pass filters 5 and 6 respectively. Vertical low pass filters 5 and 6 are needed to prevent vertical aliasing as more fully discussed in the '557 application. Two dimensional band stop filters 7 and 8 are not needed in the conventional mode and are therefore bypassed to provide a direct path for the Q and I signals of NTSC 1 to vertical decimators 9 and 10 respectively, each one of which passes I or Q components for one out of every four source lines under the control of controller 18. Since NTSC 1 is an interlaced signal each frame consists of a field of 262 odd lines and a field of 262 even lines, decimation in decimators 9 and 10 therefore takes place with respect to groups of consecutive lines for each field, for example lines 1, 3, 5 and 7 for the odd field and then lines 2, 4, 6 and 8 for the even field. For each of these groups only one out of the four components derived from these lines gets passed through the respective decimator. The above description concerning the chrominance processing of NTSC 1 with respect to filters 2, 3, 4, 5 and 6 and vertical decimators 9 and 10, is mirrored for NTSC 2 in filters 52, 54, 56, 58 and 60, and vertical decimators 64 and 66.

The use of the number 2 in parenthesis herein denotes that the explanation is for both the NTSC 1 signal and the NTSC 2 signal. In the first field Q1-1(2) is passed while Q3-1(2), Q5-1(2) and Q7-1(2) are dropped. The same pattern is continued throughout the first field up to its last line. This pattern continues with the even field so that Q2-1(2) is passed and Q4-1(2), Q6-1(2) and Q8-1(2) are dropped. In the next frame, which again consists of an odd field and an even field, Q3-1(2) is passed and Q1-1(2), Q5-1(2), and Q7-1(2) are dropped and so on. Similarly for the even field, Q4-1(2) is passed and Q2-1(2), Q6-1(2) and Q8-1(2). As is more completely described in the '557 application, the sequencing pattern can be changed by periodic resetting of the counter in the controller 18 which may have an external switch (not shown) which allows the selection of a desired type of sequencing at the encoding end. A control signal signifying the selection must be then included in the transmitted signal, e.g. in the vertical interval.

The Q and I components of both NTSC 1 and NTSC 2 are then subjected to 8:1 compression and 4:1 compression respectively in compressors 12, 13 and 68, 70. The use of the cross point switches 11 and 14 are not needed in the conventional mode and therefore are bypassed as shown in FIG. 1a. The outputs of compressors 12, 13, 68 and 70 are applied through switch 14a and 14b respectively. Under the control of controller 18, the respective compressed Q and I components of NTSC 1 and NTSC 2 are applied in the correct time sequence to preemphasis circuits 15 and 17 and thereby to adaptive delay 16 and 18a respectively. Switches 14a and 14b are controlled by controller 18 which switches between the respective Q and I signals from NTSC type signals 1 and 2 respectively in accordance with the component protocol which will be described below.

Luminance Encoding

Turning to the processing of luminance for NTSC 1 and NTSC 2, the Y components of each are passed from horizontal low pass filters 4 and 56 respectively, directly to decimators 28 and 61 respectively which have decimation ratios of 2:1. The decimation ratio of decimator 28 is changed to 2:1 from its 4:1 ratio as used in the HDTV mode and bandstop filter 20a is bypassed under the control of controller 18. In addition 4:1 vertical decimator 29 is disabled in the conventional mode by controller 18. For the odd fields of NTSC 1 and NTSC 2, only the luminance components for every other line of each field passes through decimators 28 and 61, for example, Y1-1(2), Y5-1(2), Y9-1(2) etc. Similarly, Y2-1(2), Y6-1(2), Y10-1(2) etc. of the even fields of NTSC 1 and NTSC 2 are passed through decimators 28 and 61. The luminance components pass from decimators 28 and 61 to compressors 30 and 62 respectively where they are time compressed at a ratio of 10:7. The compression ratio of compressor 30 is changed to 10:7 from an expansion of 9:16 used in the HDTV mode, by controller 18. From compressors 30 and 62, the compressed luminance components pass to preemphasis circuits 32 and 34 and thence to adaptive delays 36 and 35 respectively from which they are assembled in multiplexer 19 in accordance with the MAC signal configuration described below. The luminance signal from compressor 62 is connected to preemphasis circuit 34 through switch 14c which is controlled by controller 18.

Figure 2:
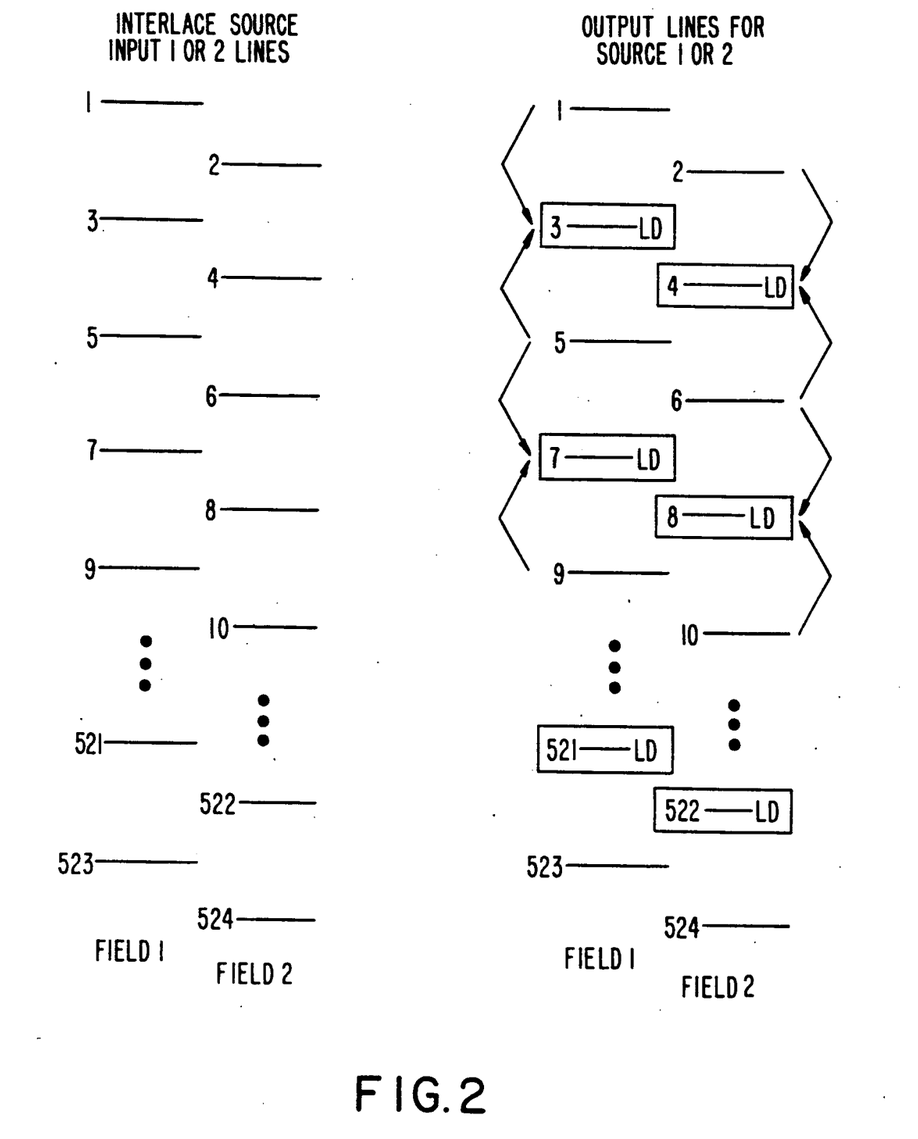
FIG. 2 describes the derivation of line differential signals in accordance with the invention.

Luminance components not passed by decimators 28 and 62, for example Y3-1(2), Y7-1(2) etc. and Y4-1(2), Y8-1(2) etc. are not included as part of the HDMAC-60 signal but instead line differential signals are generated in vertical high pass filters 22 and 72, for NTSC 1 and NTSC 2 respectively. As described in the '557 application, line differential signals can be generated according to various formulas, for example $b - (a + c)/2$. For the instant embodiment the derivation of line differential signals for NTSC 1 and NTSC 2 is illustrated in FIG. 2.

From filters 22 and 72, the respective line differential signals pass to and are vertically decimated at a 2:1 ratio by decimators 23 and 74 which are synchronized so as to be out of phase with decimators 28 and 61 respectively so that only the line differential signals corresponding to the omitted luminance signals are passed.

The line differential outputs, for example LD3-1(2), LD7-1(2), LD4-1(2), LD8-1(2) etc. are compressed at a 4:1 ratio by compressors 24 and 76 for NTSC 1 and NTSC 2 respectively. The compression ratio of compressor 24 is changed by controller 18 to 4:1 from 2:1 as used in the HDTV mode. The compressed line differential outputs then pass through respective sequential delays 25 and 25a to respective inputs of switch 14d which in turn, under control of controller 18 alternatively couples the NTSC 1 and NTSC 2 line differential signals to preemphasis circuit 27a, adaptive delay 27 and multiplexer 19 for proper assembly with the other components in accordance with the HDMAC-60 line configuration as described below.

Figure 3:
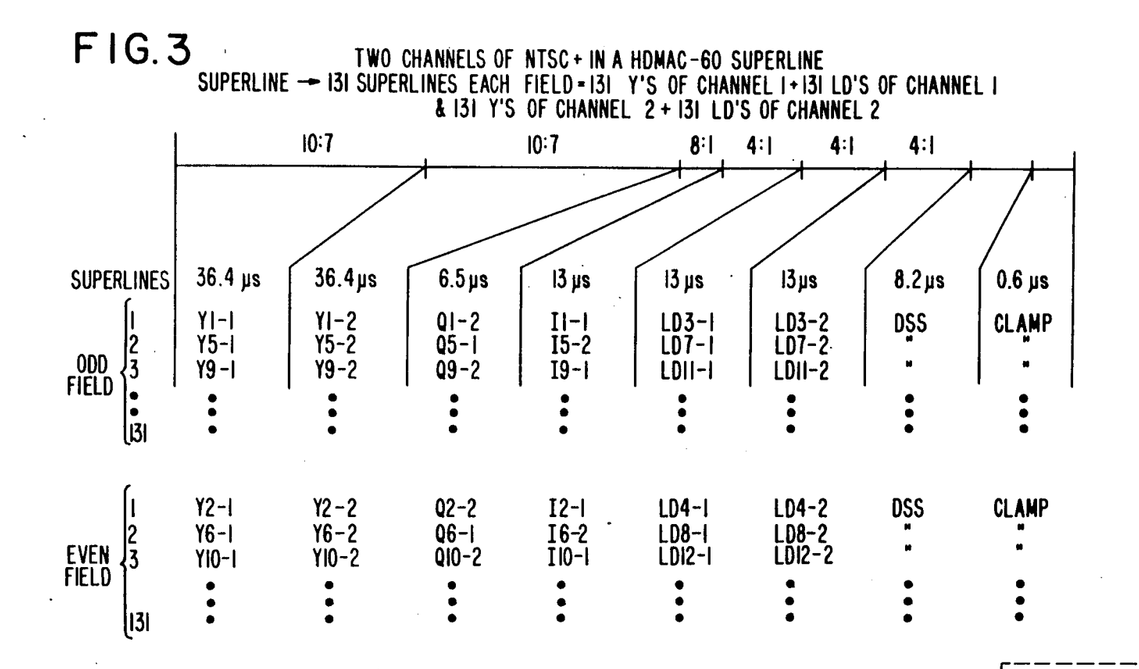
FIG. 3 describes the structure of several superlines of an HDMAC-60 signal encoded with two conventional signals in accordance with the present invention.

FIG. 3 describes schematically several superlines of an HDMAC-60 signal which result from the encoder embodiment described above. The proper timing and switch control necessary to place the various signal components in the desired sequence, are controlled by controller 18.

The HDMAC-60 signal provides 131 superlines for each field. As described above, in the conventional mode the NTSC 1 and NTSC 2 signals are supplied as interlaced signals having odd and even fields. FIG. 3 describes several superlines for an odd field and several superlines for an even field. It is to be understood that NTSC 1 and NTSC 2 must be frame synchronized before they are processed in accordance with the invention.

In the example described in FIG. 3, for an odd field input, superline 1 will emerge from multiplexer 19 having a luminance component from NTSC 1, for example Y1-1, in the first 36.4 μs. of the superline period. It will be followed by a luminance component from NTSC 2, for example Y1-2 in the next 36.4 μs. of the superline period. The luminance components will be followed by chrominance components Q and I from NTSC 2 and 1 respectively (Q1-2 and I2-1), the Q component taking the next 6.5 μs. of the superline period and the I component taking the following 13 μs. of the superline period. Controller 18 supplies the necessary timed control signals to switches 14a and 14b so that on each successive superline, the Q and I components are alternatively from NTSC 1 and NTSC 2. In other words, superline 1 sends a Q component from NTSC 2 and an I component from NTSC 1. Superline 2 needs a Q component from NTSC 1 and an I component from NTSC 2. It is to be noted that not every Q and I component for each decimated line of each field is sent as part of a superline.

In the next time slot, a line differential signal from NTSC 1, for example LT3-1, taking 13 μs. of the superline period is provided. This is followed by a line differential signal from NTSC 2, for example LD3-2, in the next 13 μs. of the superline period. As described in the '557 application, the superline period can also include a digital sound packet and a clamp.

The subsequent superlines generated for the odd fields of NTSC 1 and NTSC 2 follow the decimation pattern provided by the encoder of FIG. 1a. The processing of the input lines of the even fields of NTSC 1 and NTSC 2 follows a similar sequence and structure.

It is to be understood that the placement of the components on each superline, their relative time periods and the input lines from which they are derived, are arbitrary and can be altered without deviating from the instant invention.

Figure 4:
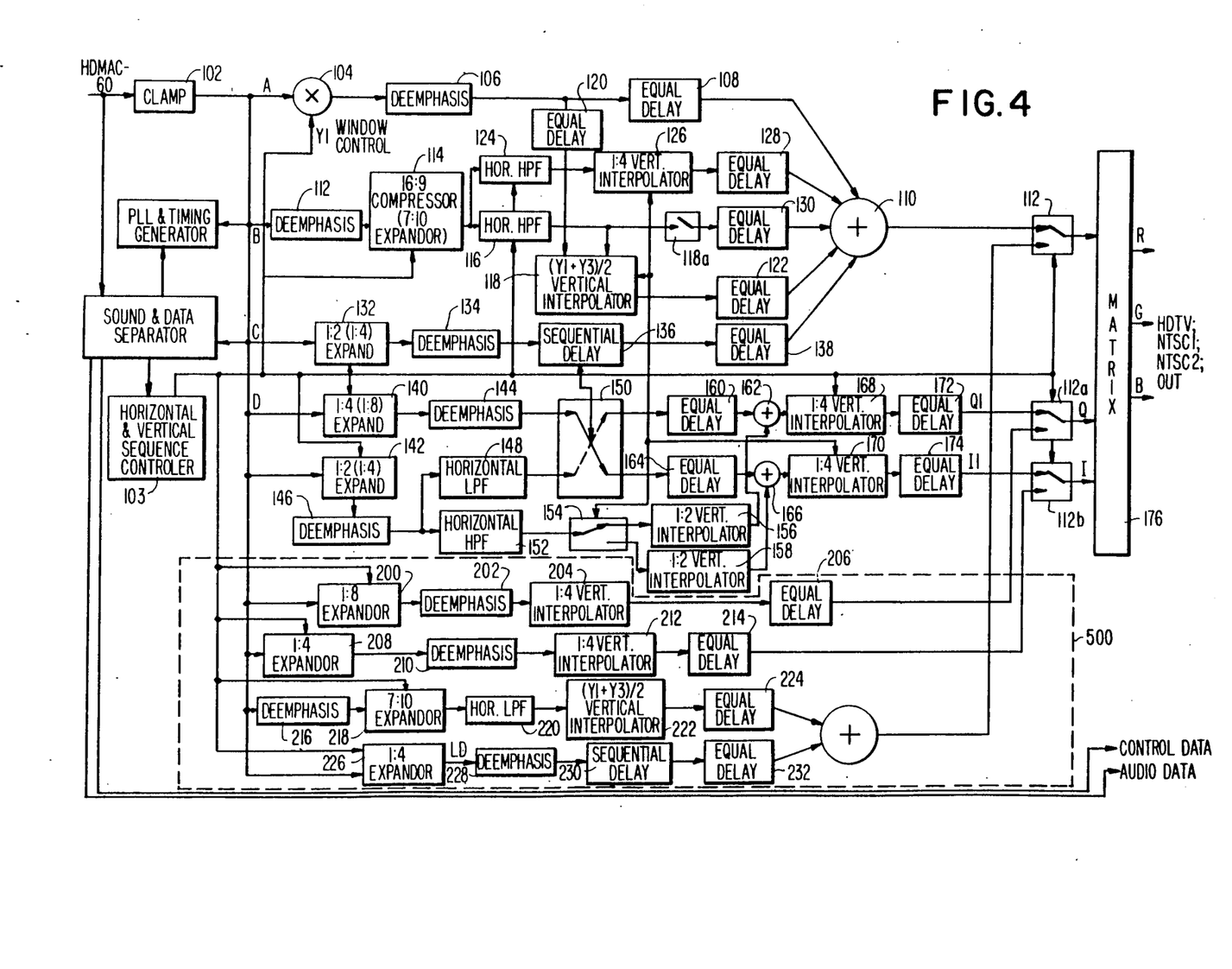
FIG. 4 is a block diagram of an embodiment of an HDMAC-60 decoder designed for switchable use in accordance with the invention.

FIG. 4 describes an embodiment of an HDMAC-60 decoder which has been modified for optional use in accordance with the instant invention. The unmodified decoder is fully described and shown in FIG. 5 of the '557 application in connection with the decoding of an HDTV signal. The decoder shown in FIG. 4 includes a new section 500 for processing the NTSC 2 information included on the HDMAC-60 signal when in the conventional mode described above. In addition switches 112, 112a, 112b and 118a have been added. Control of these new circuits is provided by controller 103 as described below.

Figure 5:
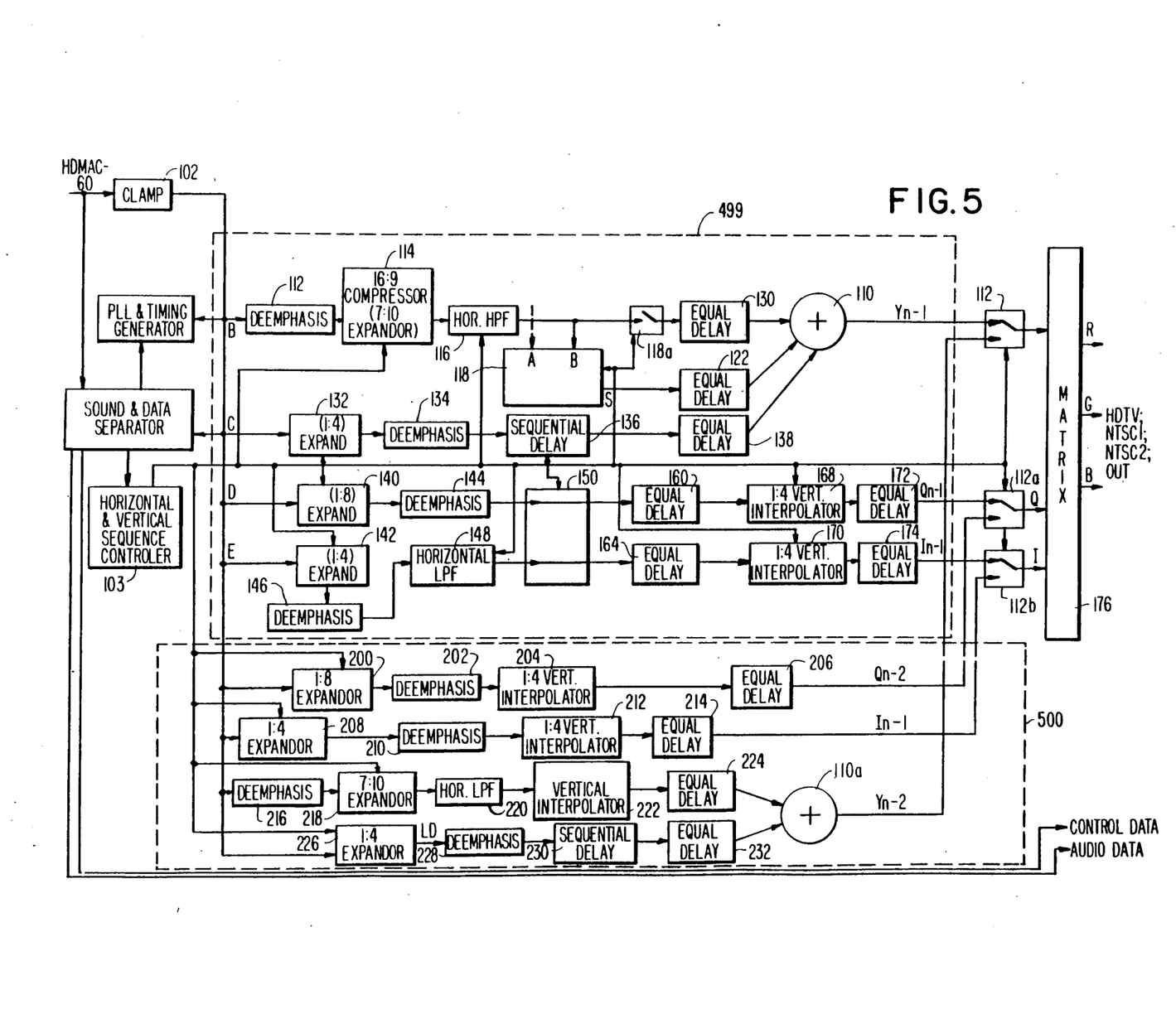
FIG. 5 is the block diagram of FIG. 4 redrawn to indicate the signal paths and circuit conditions present when the decoder is placed in the conventional mode.

FIG. 5 describes the decoder of FIG. 4 redrawn to show the circuit paths and processes used when an HDMAC-60 signal configured in the conventional mode is being received. The user can select either NTSC 1 or NTSC 2 when the decoder is used in the conventional mode by direct control of the controller (for example by a switch). Similarly, when in the HDTV mode, selection of the HDTV signal can be made either automatically as a result of sensing means (not shown) which can be part of the controller 103, or by a user switch (not shown).

Operation of the decoder in accordance with the invention will not be described in conjunction with FIG. 5. As described above, in the conventional mode the HDMAC-60 superline provides luminance and chrominance components comprising two NTSC type signals, NTSC 1 and NTSC 2. The user can select one of the signals by causing switches 112, 112a and 112b to select the Y, I and Q outputs from either section 499 or 500 respectively. Switch 118a is placed in the open position by controller 103 when conventional mode signals are being processed. Section 499 is also used to decode HDTV signals when these are being encoded and sent via the HDMAC-60 signal. For purposes of explanation, we will assume that a number of superlines of an odd field is being processed (for example those shown in FIG. 3).

Luminance Decoding

The clamped video signal is applied to deemphasis circuits 112 and 216 which provide compensation for the effects of preemphasis circuit 34 of the encoder. The outputs of deemphasis circuits 112 and 216 are applied to expanders 118 and 218 respectively. When the HDMAC-60 signal is providing conventional mode NTSC type signals, expander 118 provides a 7:10 expansion ratio. When however the HDMAC-60 signal is providing HDTV mode information, expander 118 provides a 16:9 compression ratio as described in the '557 application. The selection of compression (expansion) ratio is affected by controller 103. Expander 218 also has a 7:10 expansion ratio. The expanded signals from 118 and 218 are then filtered in horizontal filters 116 and 220 respectively to attenuate frequencies above 6.6 MHz.

Figure 5A:
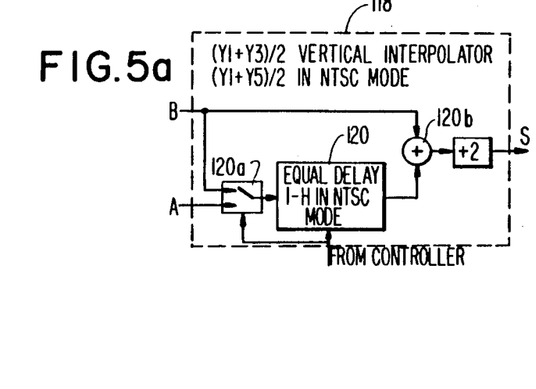
FIG. 5a is a block diagram of a vertical interpolator used in the decoder.

In path B of section 499, the filtered NTSC 1 luminance signal, for example Y5-1 of odd superline 2, is then applied to vertical interpolator 118. As shown in FIG. 5a, interpolator 118 has been modified to incorporate equalizing delay 120 of FIG. 5. This modification enables the interpolator to switch the choice of inputs from both paths A and B, as used in the HDTV mode, to just the B path for conventional mode use, under the control of controller 103. Assuming that on the previously received superline (e.g. odd superline 1) Y1-1 was similarly applied and stored in delay 120, upon reception of odd superline 2, Y5-1 is fed to both delay 120 and adder 120b where it is combined with previously received Y1-1 delayed appropriately by delay 120. Interpolator 18 receives a timing signal input from controller 103 and performs the function of interpolating Y1-1 and Y5-1 (using a formula, for example (Y1+Y5/2) and providing this output at output S which is properly delayed in a further equalizing delay 122. The interpolated luminance signal for NTSC 1 (Y1-1+Y5-1)/2 is then applied to adder 110. Similar processing of the NTSC 2 luminance signals Y1-2 and Y5-2, takes place in deemphasis circuit 216, expander 218, filter 220, interpolator 222, delay 224 and adder 110a.

The output of clamp 102 is also applied to path C of section 499 for processing NTSC 1 line differential components, example LD3-1, LD3-1 is applied to expander 132 which has a switchable expansion ratio under the control of controller 103. In the HDTV mode its compression ratio is 1:2 however in the conventional mode this ratio is 1:4. As described in the '557 application, the timing signal generated by controller 103 indicates the presence of LD components on the HDMAC-60 signal so that only these portions of the signal are expanded. The output of expander 132 is applied to deemphasis circuit 134 which has the inverse characteristic of preemphasis circuit 27a of the HDMAC-60 encoder. Sequential delay 136 holds the expanded LD3-1 component received from odd superline 1, so that it can be combined with LD1-1 and LD5-1 upon reception of odd superline 2. The LD3-1 is then applied through equalizing delay 138 and applied to adder 110. Adding LD3-1 to the correctly timed output of equalizing delay 122, namely Y1-1+Y5-1)2, results in the output from adder 110 of reconstructed luminance signals Y1-1, Y3-1 and Y5. Similar processing of QTSC 2 line differential signals, for example LD3-2, takes place in section 500 via expander 226, deemphasis circuit 228, sequential delay 230, equalizing delay 232 and adder 110a.

Chrominance Decoding

The clamped incoming NTSC-1 signal is applied via path D. Expander 140 receives a timing signal from controller 103 passes at the proper time only the Q component of each superline. As shown in the example of FIG. 3, each superline can provide one Q component and one I component. Because a Q and I component is not provided for every source line, if one (in this embodiment) provides a Q component for NTSC 2 and an I component for NTSC 1, the next superline will provide a Q component for NTSC 1 and an I component for NTSC 2 (see odd superlines in FIG. 3). Assuming therefore that a superline provides a Q component for NTSC 1, for example Q5-1, under control of the timing signal of controller 103, this component is provided to expander 140. Expander 140 has a switchable expansion ratio depending on the mode of use, either conventional or HDTV (1:8 or 1:4 respectively) which is under the control of controller 103. The output from expander 140 is sent to deemphasis circuit 144 which has the inverse characteristic of preemphasis circuit 15. When in the conventional mode, cross point switch 150 is disabled and provides a direct and unchanging path from deemphasis circuit 144 to equalizing delay 160 for Q5-1 (and all other Q components to be decoded further). It is to be noted that horizontal filter 152, switch 154, vertical interpolators 156 and 158, and adders 162 and 166 are disabled by controller 103 when conventional mode signals are being processed as described in FIG. 5. The output of equalizing delay 160 is therefore directly provided to interpolator 168. At the output of interpolator 168 four Q components are furnished.

Interpolator 168 and indeed all of the interpolators described herein, can, as described in the '557 application, operate in accordance with any desired interpolation scheme. In the simplest case, as in this example, each interpolator is a storage in which information is maintained until new information is received.

Processing of I components, for example I1-1 takes place as follows. Under control of the timing signal of controller 103, I1-1 is provided to expander 142. Expander 142 has a switchable expansion ratio depending on the mode of use, either conventional or HDTV (1:4 or 1:2 respectively) which is under the control of controller 103. The output from expander 142 is sent to deemphasis circuit 146 which has the inverse characteristic of preemphasis circuit 17. As described above, when in the conventional mode, cross point switch 150 provides a direct and unchanging path from deemphasis circuit 146 to equalizing delay 164 for I1-1 (and all other I components to be decoded further). Horizontal low pass filter 148 is bypassed under the control of controller 103 when in the conventional mode. The output of equalizing delay 164 is applied to interpolator 170. At the output of interpolator 170 four I components are furnished.

Q and I components for NTSC 2 are similarly processed in section 500. Q is processed by expander 200, deemphasis circuit 202, interpolator 204 and equalizing delay 206. I is processed by expander 208, deemphasis circuit 210, interpolator 212 and equalizing delay 232. Even superlines are processed in the same manner as explained above in connection with the odd superlines.

Switches 112, 112a and 112b, which can be user selectable, determine whether the Y, Q and I outputs provided to the RGB matrix 176 come from section 499 or 500, thereby determining the choice between NTSC 1 or NTSC 2 respectively. The RGB output of matrix 176 can be viewed on a monitor capable receiving conventional television signals, in this example 525 lines, 2:1 interlaced. The RGB output can be easily NTSC encoded for further transmission and reception on standard television broadcast receivers.

In the HDTV mode, only section 500 of the decoder is used as explained in the '557 application.

The conventional signals processed in connection with the instant invention, although being for example NTSC type signals, are capable of providing higher than standard NTSC encoded broadcast quality signals. Provision is made for providing digital quality sound, and a choice of aspect ratio is offered which depends solely on the source signal and the monitor used to display the decoded RGB outputs.

The instant invention provides the capability for transmitting for example, two NTSC type signals which have quality parameters exceeding those of NTSC signals encoded for reception on standard broadcast T.V. receivers. As a result, if RGB monitors having enhanced reception capabilities are used to receive the decoded signals described above, higher vertical and horizontal resolution, with respect to NTSC encoded signals, can be provided. In addition, different aspect ratios can be provided, for example 16:9 rather than 4:3.

Figure 6A:
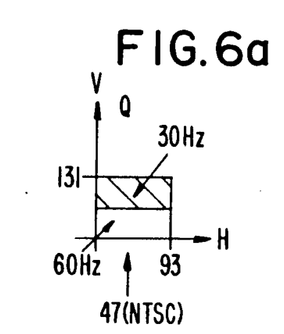
Figure 6B:
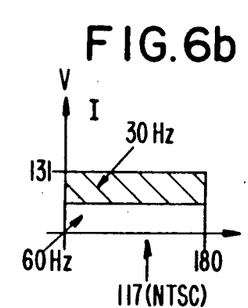
Figure 6C:
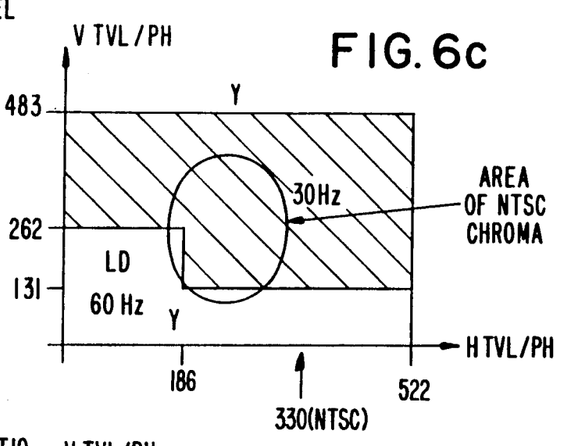

FIG. 6a, 6b and 6c are two-dimensional spectra of Q, I and Y components respectively of NTSC type signals which can be provided in accordance with the invention at a 4:3 aspect ratio. The notation (NTSC) indicated on each horizontal axis indicates the horizontal resolution available with an NTSC signal after standard encoding for broadcast. The shaded of each FIG. indicates the increased resolution at a 30 Hz sampling rate, i.e. for every two superlines. The portion of 6c in the oval corresponds to the chrominance provided in a standard NTSC encoded signal.

Figure 7A:
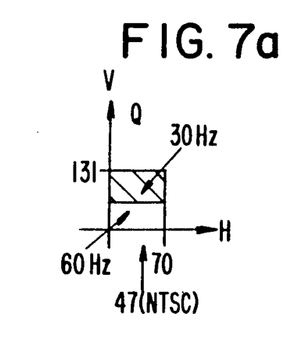
Figure 7B:
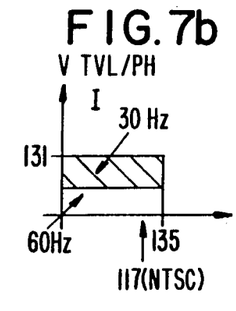
Figure 7C:
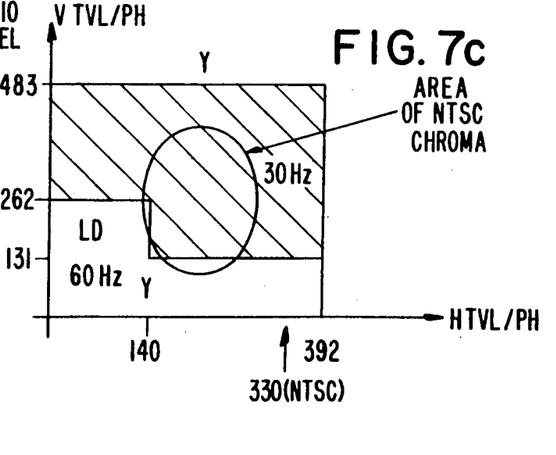

FIGS. 7a, 7b and 7c describe the parameters of an NTSC type signal which can be provided in accordance with the invention at an aspect ratio of 16:9.

Although the present invention has been described in a specific embodiment, it is not to be limited thereto. Many variations will occur to one skilled in the art and these are intended to be encompassed in the following claims.

I claim:

1. A method for encoding as a time multiplexed signal, a plurality of television signals each comprising a plurality of lines, each of said lines having a first line period, said method comprising the steps of:
   a) processing a first group of lines from a first television signal so as to derive from one line of said first group a first luminance component and a first chrominance component, and from at least two line of said first group a first line differential component;
   b) processing a second group of lines from a second television signal so as to derive from one line of said second group a second luminance component and a second chrominance component, and from at least two lines of said second group a second line differential component; and
   c) time multiplexing said first and second luminance components, said first and second chrominance components and said first and second line differential components so as to form a time multiplexed signal having a second line period greater than said first line period.

2. An apparatus for encoding as a time multiplexed signal, a plurality of television signals each comprising a plurality of lines having a first line period, said apparatus comprising:
   a) means for processing a first group of lines from a first of said television signals so as to derive from one line of said first group a first luminance component and a first chrominance component, and from at least two lines of said first group a first line differential component;
   b) means for processing a second group of lines from a second of said television signals so as to derive from one line of said second group, a second luminance component and a second chrominance component and, from at least two lines of said second group a second line differential component; and
   c) means of time multiplexing said first and second luminance components, said first and second chrominance components and said first and second line differential components so as to form a time multiplexed signal having a second line period greater than said first line period.

3. The apparatus as claimed in claim 2 wherein said time multiplexed signal can be transmitted or recorded over a channel having a channel bandwidth which is more narrow than the combined channel bandwidth necessary to transmit or record each of said television signals individually.

4. A receiver for receiving a time multiplexed signal having a given line period, said time multiplexed signal comprising within said line period, at least one luminance component, at least one chrominance component and at least one line differential component derived from a plurality of television signals, said apparatus comprising:
   a) means for processing said time multiplexed signal into respective groups of television lines comprising respective television signals, each of said television lines having a line period which is shorter than said given line period; and
   b) means for selecting one of said conventional television signals for display.

* * * * *